July 28, 1964 D. FIRTH ETAL 3,142,262
PRESSURE FLUID PISTONS OR PLUNGERS
Filed Aug. 24, 1961 6 Sheets-Sheet 1

Inventor

By

Attorney

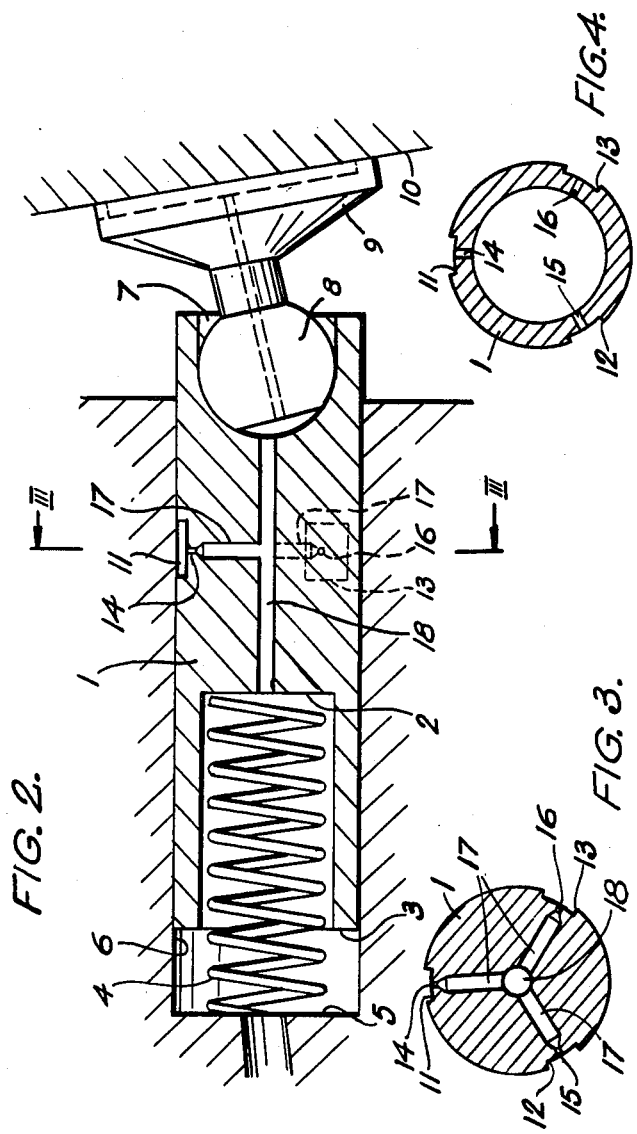

United States Patent Office 3,142,262
Patented July 28, 1964

3,142,262
PRESSURE FLUID PISTONS OR PLUNGERS
Donald Firth and Roger Harvey Yorke Hancock, both of East Kilbride, Glasgow, Scotland, assignors to Council for Scientific and Industrial Research, London, England, a corporation of the United Kingdom
Filed Aug. 24, 1961, Ser. No. 133,703
Claims priority, application Great Britain Aug. 31, 1960
9 Claims. (Cl. 103—162)

This invention relates to reciprocating piston machines in which a piston converts fluid pressure into mechanical power or vice versa and in which the piston is engaged directly by a connecting rod or equivalent member which controls the displacement of the piston whilst the line of thrust of the rod is normally inclined to the axis of the piston, or the angle of inclination varies during the working cycle. Examples of such machines are a crankshaft driven machine and a swash-plate pump or motor.

Pistons in machines of the above type normally operate on a regular cycle during which they experience varying lateral component of thrust, and where the piston is constrained against rotation in its cylinder so that no hydrodynamic lubrication due to rotation is available—and in fact wherever such lubrication is lacking, as at the instant of starting—metal-to-metal contact between the piston and its cylinder wall can—and often does—occur with consequent high friction and rates of wear, as well as risk of seizure of the piston in the cylinder.

In order to avoid or minimise this condition, a reciprocating piston machine according to the present invention has one of the piston/cylinder contacting surfaces provided with a plurality of recesses or pockets grouped symmetrically around an imaginary circumferential line or zone, each recess or pocket being fed with fluid under pressure through a respective construction which permits fluctuations in fluid pressure in the pocket with changes in clearance between the piston and the cylinder wall.

The pockets can be formed in either the piston or the cylinder wall, and in the former case the piston may be counterbored through its crown to provide a supply of liquid for the pockets at the working pressure of the working pressure of the machine.

Advantageously, a non-return valve is included in the common supply of fluid at working pressure to a group of pockets so as to reduce the fluctuations in pressure at a pocket due to fluctuations in working pressure in the associated cylinder over each cycle.

The arrangement is such that, with zero lateral reaction thrust on the piston, the fluid pressure in the group of pockets is balanced around the piston and the latter is centralised in the cylinder with equal leakage from all pockets. As soon, however, as there is a resultant lateral reaction thrust on the piston tending to displace it to one side of the cylinder axis, the clearance between the piston and cylinder wall on that side is reduced and leakage from the adjacent pocket or pockets falls with consequent rise in pressure therein. Simultaneously, leakage increases from the pocket or pockets on the opposite side of the piston, with consequent reduction in fluid pressure. This unbalance of hydrostatic pressure acting on the piston at these pockets opposes the resultant lateral reaction thrust in proportion to the displacement produced thereby, and thus tends to maintain the piston centralised in its cylinder under all conditions of changing lateral reaction thrust.

Practical embodiments of the present invention in swash plate type hydraulic machines will now be described, by way of example only, with reference to the accompanying drawings in which:

FIGURE 2 is a longitudinal section through the piston of FIGURE 1;

FIGURE 3 is a section on the line III—III of FIGURE 2;

FIGURE 4 is a view similar to FIGURE 3 of a modification;

Figure 7:
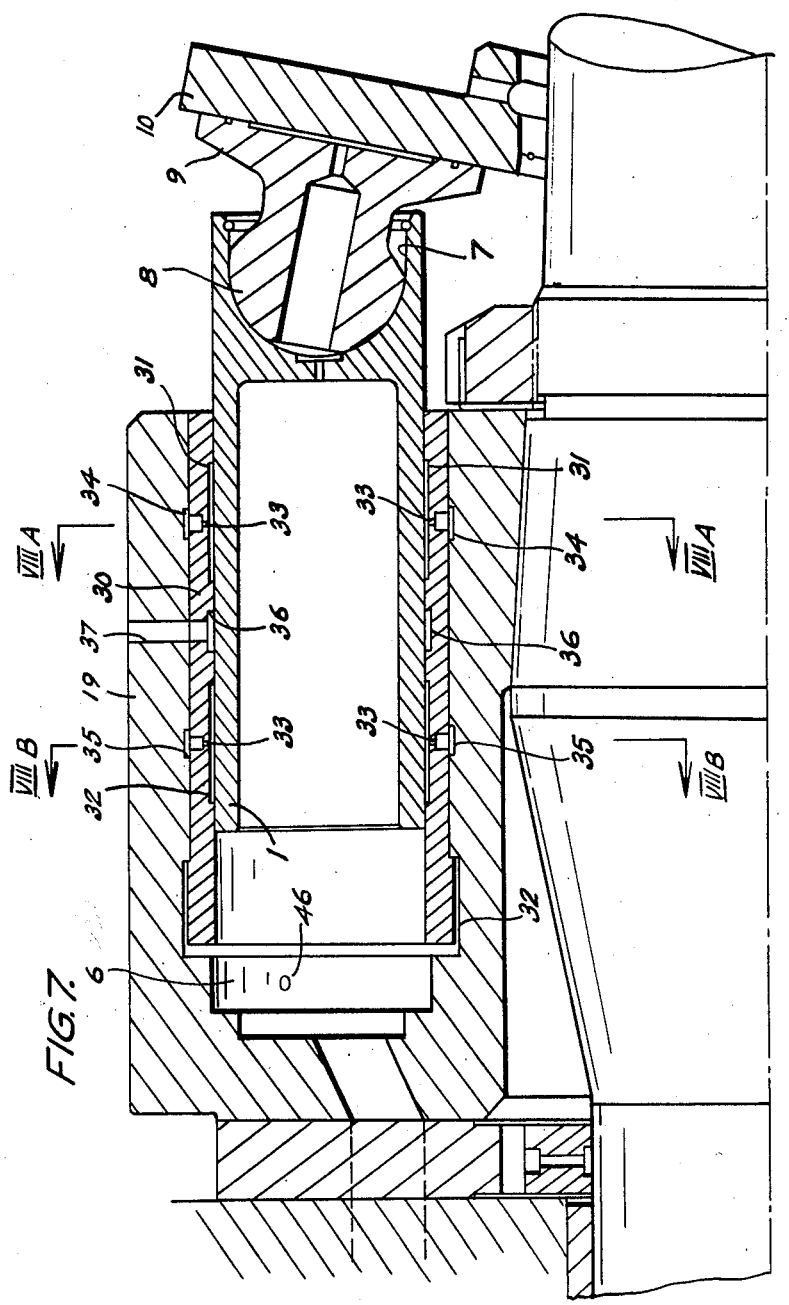
FIGURE 7 is a section similar to FIGURE 5 of a modified arrangement of pockets in a cylinder.
Figure 8:
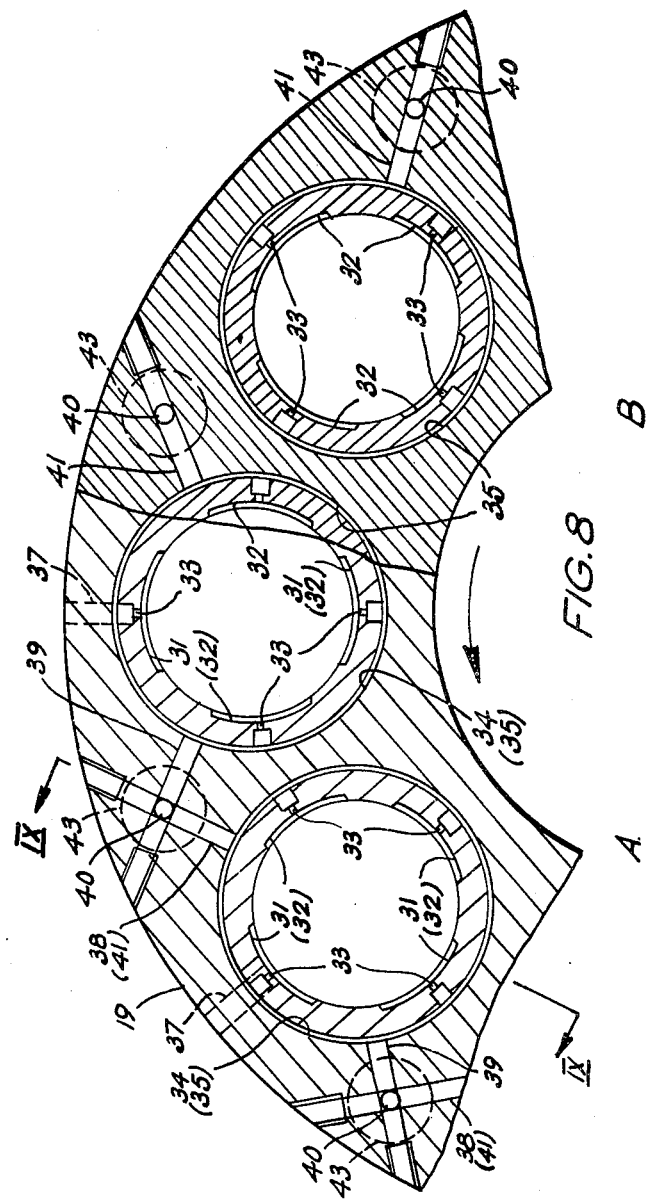
Figure 9:
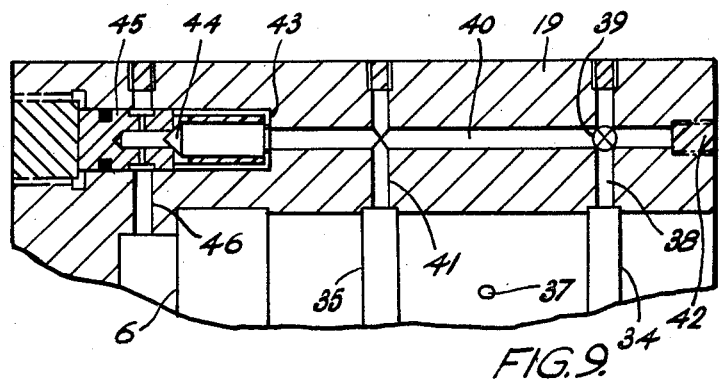

FIGURES 8A and B are a composite section on the lines VIIIA—VIIIA and VIIIB—VIIIB of FIGURE 7;

FIGURE 9 is a section on the line IX—IX of FIGURE 8, and

Figure 10:
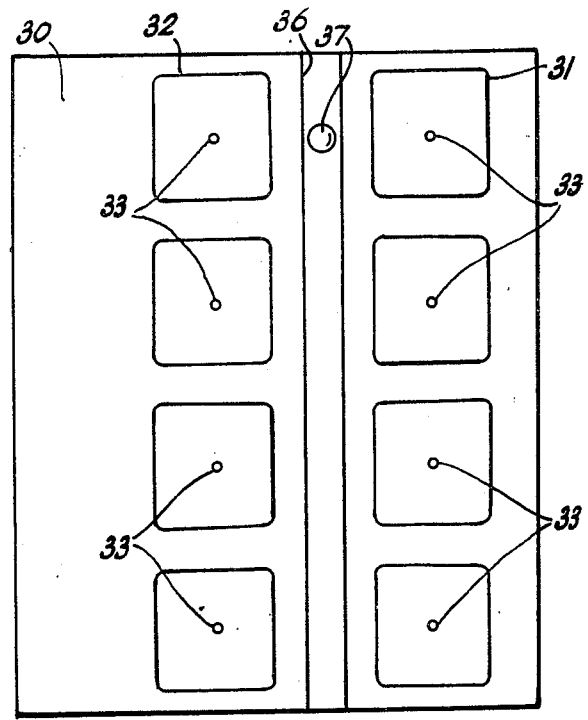

FIGURE 10 is a developed diagram of the internal surface of the cylinder liner of FIGURE 7.

Figure 1:
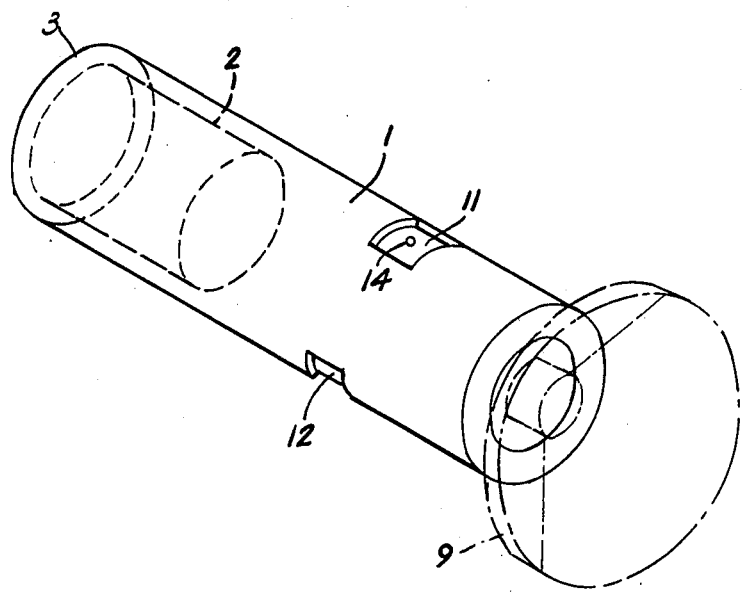
FIGURE 1 is a perspective view, as seen from the swash plate of a piston having pockets formed therein.

Referring first to FIGURES 1–3 of the drawings, which show, in somewhat simplified form, a piston and slipper for a conventional swash plate pump or motor in which the cylinder block rotates and the swash plate is movable only for adjustment of the angle of tilt, the piston 1 is counterbored at 2 from the working face 3 to provide a housing for a compression spring 4 between the piston and the port end 5 of the cylinder 6. The opposite end of the piston has a hemispherically based socket 7 to receive the ball end 8 of a slipper 9 which runs on the swash plate 10.

Normally in swash plate machines the piston 1 is free to rotate under the action of drag in the lubricant film between the ball end 8 of the slipper 9 and the socket 7 in which it is captive, the slipper 9 in turn being rotated about its axis by drag as it moves over the surface of the swash plate 10. In such a case, the piston 1 may rotate sufficiently to set up hydrodynamic lubrication between it and the wall of the cylinder 6, and thereby prevent metal-to-metal contact between the piston and the cylinder wall.

In the present arrangement, however, the friction between the piston 1 and the spring 4, and between the spring 4 and the end wall 5 of the cylinder 6, is sufficient to overcome the drag torque on the piston from the ball 8. Hence the piston 1 either does not rotate at all, or rotates at low speed or intermittently, and no hydrodynamic lubrication takes place.

To overcome the effects of insufficient hydrodynamic lubrication, therefore, three shallow pockets or recesses 11, 12, 13 (see especially FIGURE 3) are machined at equiangular intervals in the outer circumference of the piston 1 on a common circumferential centre line. The pockets are grouped near the socket end of the piston 1, but in a position such that they always remain covered by the cylinder wall. In the centre of each pocket is a constricted orifice 14, 15, 16, respectively, each orifice being connected by a radial duct 17 to an axial canal 18 leading from the counterbore 2 to the socket 7. The canal 18 thus feeds working fluid at cylinder pressure from the working face 3 of the piston 1 to each radial duct 17 and thence to each pocket 11, 12, 13.

During each revolution of the cylinder block 19, the piston 1 experiences a resultant lateral thrust which varies in magnitude, and probably somewhat in direction. This means that the clearance gap between the piston and cylinder varies angularly, and the counteracting pressure at the pockets 11, 12, 13 follows this angular variation.

FIGURE 4 shows a modified arrangement in which the counterbore 2 is extended as far as the plane of the axes of the constricted orifices 14, 15, 16. This arrangement simplifies the formation of the orifices which can now be plain holes drilled through the piston wall.

The number, shape, and size of the pockets 11, 12, 13 may be varied to suit particular requirements, and the size of the constricted orifices 14, 15, 16 will be dependent on operating conditions.

Figure 5:
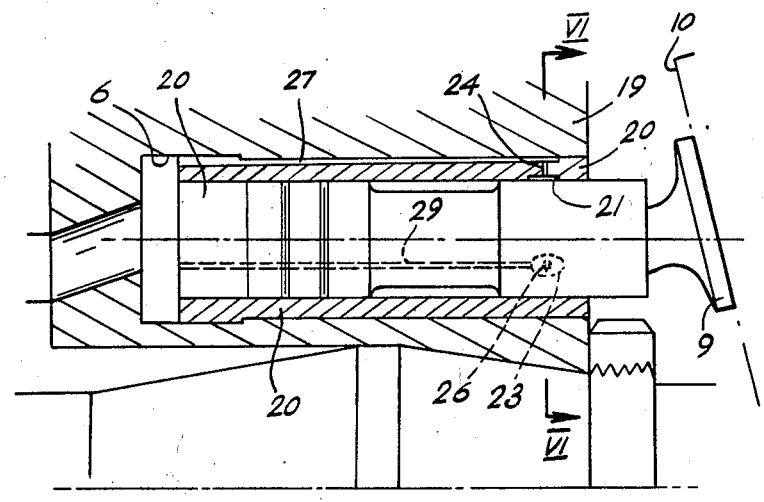
FIGURE 5 is a section similar to FIGURE 2 through a linered cylinder having pockets formed in the cylinder wall.
Figure 6:
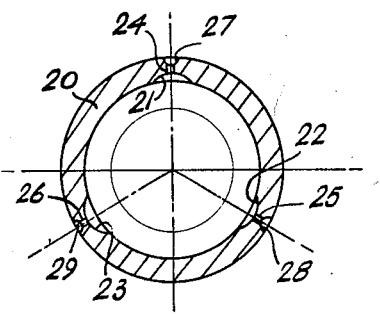
FIGURE 6 is a section on the line VI—VI of FIGURE 5.

In FIGURES 5 and 6, the cylinder 6 has a shrunk-in liner 20 around the internal surface of which are grouped three pockets or recesses 21, 22, 23 at equiangular intervals near the outer or swash plate end of the cylinder 6. Each pocket is supplied with hydraulic fluid through a respective constricted orifice 24, 25, 26 from a corresponding longitudinal groove 27, 28, 29. Oil is thus fed from the high pressure working space in the cylinder 6 to each pocket in substantially the same manner as in FIGURES 1–4.

FIGURES 7–10 illustrate a modified arrangement of hydraulic pockets in the cylinder wall. In this modification—as seen best in the developed diagram of FIGURE 10—there are two circumferential groups 31, 32 of rectangular-shaped shallow pockets equiangularly spaced around the internal wall of the cylinder liner 30. The spacing between the groups axially of the cylinder is preferably such that they remain covered by the piston throughout its stroke. Each pocket 31 or 32 is fed with oil through a respective constricted orifice 33, the orifices for the top or outer group of pockets 31 being supplied from a common outer or top circumferential channel or gallery 34 machined in the cylinder block 19 to register with the corresponding orifices 33 in the liner 30, whilst the orifices for the bottom or inner group of pockets 32 are supplied from a similar inner or bottom channel or gallery 35. Between the two groups of pockets 31, 32 is a circumferential leakage groove 36 vented to atmosphere at 37.

The top gallery 34 is fed with hydraulic fluid under pressure by a pair of ducts 38, 39, each of which lies radial to the cylinder 6 and intersects a respective longitudinal distributor passage 40. The bottom gallery 35 is fed with hydraulic fluid by a single duct 41 parallel to the duct 38 and also intersecting the passage 40.

The outer or top end of the distributor passage 40 is closed—for example by a conventional plug 42—whilst its inner or bottom end opens into a non-return valve chamber 43. This chamber houses a non-return valve head 44 and a seating plug 45. The seating communicates, through a bore 46, with the working space within the cylinder 6. Thus, high pressure fluid within the cylinder 6 can bleed through the bore 46, non-return valve 45, 44, and distributor passage 40 to the galleries 34, 35 and hence to the pockets 31, 32 via the restricted orifices 33. These now function in the same manner as in FIGS. 5 and 6. Leakage from the pockets 31, 32 is exhausted through the vent 36, 37.

A cylinder is under line pressure for a half of each revolution of the block 19. Over the other half it is under low pressure—i.e. induction for a pump, exhaust for a motor—which would cause rapid fluctuations in the system and introduce time lags in the build-up of pressure in the pockets during the transition from low to high pressure. This difficulty, however, is countered partly by the non-return valve 44 and partly by the interconnection of each distributor passage 40, through the duct 39, with the next following passage 40 so that, as a cylinder moves from the high to the low pressure port, high pressure fluid is first trapped in the passage by closure of the non-return valve and then as the cylinder moves on, is maintained by the series connections 39, 34, 38 with the passages 40 associated with succeeding cylinders which are still open to the high pressure port. Furthermore, as a cylinder moves from register with a low pressure port to one at high pressure, there is a much reduced surge of pressure in the passage 40.

There will inevitably be some pressure drop around the entire system, partly because the balancing action at the pockets 31, 32 depends on leakage therefrom to produce a pressure differential in them, and partly because there must be some measurable lag in the action of each non-return valve 44, coupled with the fact that its closing movement involves a volume displacement in the hydraulic balancing circuit. The mean pressures in the passages 40 will, therefore, be lower than those appearing at the high pressure port of the machine, but fluctuations will be much reduced, and a smoother and more efficient system results.

Where the normal operating conditions of the machine are such that sudden fluctuations of pressure in the piston centering and balancing circuits will not be objectionable, the systems of FIGS. 1–4 or FIGS. 5 and 6 can be utilized with advantage, owing to their relative simplicity of manufacture. Moreover, the arrangement of FIGS. 5 and 6 may be modified somewhat in the manner of FIGS. 8 and 9 by replacing the longitudinal grooves 27, 28, 29 in the outer wall of the liner 20 by a passage 40 in the cylinder block 19 and feeding the pockets 21, 22, 23 from an annular gallery 34. The non-return valve 44 would, in this arrangement, be omitted. Such a modification simplifies and cheapens the manufacture of the liner 20.

The number, shape, size and disposition of the balancing pockets 11 . . ., 21 . . ., 31 . . . is a matter of design in the light of the operating conditions of any given machine, and the sizes of the corresponding constricted orifices will depend on the working pressures and clearances in the cylinder. The nature of the working fluid is, theoretically, unimportant, since the invention aims at providing a cushion of fluid at all times between the piston and the cylinder wall. However, it is clear that a lubricating hydraulic liquid is to be preferred to, say, an oil solvent or volatile liquid, or a gas.

We claim:

1. A reciprocating piston machine comprising a cylinder block having a plurality of cylinders; a piston reciprocable in each cylinder, a group of shallow pockets arranged circumferentially around each cylinder wall; a gallery in the cylinder block for each cylinder and interconnecting all the pockets of a group; a constriction between the gallery and each pocket; a duct connecting the working space in each cylinder to the gallery of that cylinder; and a bore connecting each gallery to the corresponding gallery of an adjacent cylinder.

2. A reciprocating piston machine comprising a cylinder block having a plurality of cylinders; a piston reciprocable in each cylinder; two groups of shallow pockets each arranged circumferentially around the cylinder wall and spaced from each other in the direction of the cylinder axis; a leakage vent opening through the cylinder wall between the two groups of pockets; a respective gallery within the cylinder block interconnecting all the pockets of each group; a constriction between each pocket and its associated gallery; a duct connecting the working space in each cylinder to both galleries of that cylinder; a non-return valve in each duct; and an interconnection between each pair of adjacent ducts on the opposite sides of the valves from the cylinder working spaces.

3. A reciprocating piston machine comprising a cylinder block having a plurality of cylinders; a liner in each cylinder; a group of pockets arranged circumferentially around the internal wall of said liner; a constricted orifice opening through said liner from each pocket; an annular gallery in the cylinder bore registering with the constricted orifices; a duct in the cylinder block connecting the working space in the cylinder to said gallery; a non-return valve in said duct; and a bore connecting each gallery to the gallery of another cylinder.

4. A swash plate hydraulic machine comprising a cylinder block; a drive shaft carrying said block; a plurality of cylinders disposed around said shaft in said block; a piston reciprocable in each cylinder; a swash plate surrounding said shaft; a slipper articulated to said piston and engageable with said swash plate; a liner in each cylinder; a group of shallow pockets equiangularly spaced around the internal wall of said liner within the limits of the stroke of said piston; a constriction opening through said liner from each pocket; a gallery in the cylinder bore in which said liner is fitted and communicating with all said constrictions of a group; a duct connecting said gallery with the working space in said cylinder, a non-return valve in said duct; a communicating bore coupling each duct connecting a gallery to the cylinder working space with the duct associated with an adjacent cylinder, said communicating bore being located on the outlet side of each non-return valve.

5. A swash plate hydraulic machine according to claim 4 wherein each liner has two groups of shallow pockets, each group symmetrically disposed about a circumferential axis and both axes lying within the limits of the swept volume of the cylinder, and a separate gallery communicating with the constrictions of a respective group of shallow pockets.

6. A swash plate machine comprising a casing; a drive shaft journalled in said casing; a cylinder block fixed on said shaft; an odd number of cylinders formed in said block substantially parallel to said drive shaft; a cylinder liner in each cylinder bore in said block; a piston reciprocable in said liner; a swash plate surrounding said drive shaft and angularly adjustable about an axis transverse to said shaft; a slipper articulated to each piston and engageable with swash plate; two groups of four shallow pockets formed in the internal wall of said liner symmetrically about a respective circumferential axis, said axes being located so as to be permanently covered by the piston during its working strokes; a constricted orifice opening through said liner from each pocket of each group; a gallery formed in the cylinder bore accommodating each liner to communicate with a respective group of constricted orifices; a common pressure fluid supply duct connecting both galleries with the working space of the associated cylinder, a non-return valve in said duct; and a communicating bore coupling each duct with the duct of another cylinder on the outlet sides of the non-return valves.

7. In a multi-cylinder pressure fluid machine in which the cycle of each piston is out of phase with the cycle of at least one other piston, a plurality of shallow pockets disposed circumferentially around the inside of each cylinder, ducts connecting the pockets in each cylinder with the working spaces in at least two cylinders whose piston cycles are out-of-phase with each other, and a constriction between each pocket and the ducts connected thereto.

8. In a multi-cylinder pressure fluid machine in which the cycle of each piston is out of phase with the cycle of at least one other piston, a plurality of shallow pockets disposed circumferentially in the inner surface of each cylinder, intercommunicating ducts connecting the pockets in each cylinder with the working spaces in at least two cylinders whose piston cycles out-of-phase with each other, a constriction between each pocket and the ducts connected thereto, and a non-return valve in each duct at a position between the cylinder working space to which the duct is connected and the point of intercommunication of the duct with the duct from another cylinder.

9. A swash plate hydraulic machine comprising a cylinder block, a drive shaft carrying said block, a plurality of cylinders disposed around said shaft in said block, a piston reciprocable in each cylinder, a swash plate surrounding side shaft, a slipper articulated to said piston and engageable with said swash plate, a group of shallow pockets equiangularly spaced around the inside of each cylinder within the limits of the stroke of the piston, a gallery for each cylinder interconnecting all the pockets of a group, a constriction between the gallery and each pocket, a system of bores interconnecting all the galleries, a duct communicating between the working space in each cylinder and said bore system and a non-return valve in each duct.

References Cited in the file of this patent

UNITED STATES PATENTS

| 587,394 | Hunt | Aug. 3, 1897 |
|---|---|---|
| 1,274,391 | Davis | Aug. 6, 1918 |
| 1,679,964 | Edwards | Aug. 7, 1928 |
| 2,155,455 | Thomas | Apr. 25, 1939 |
| 2,300,009 | Rose | Oct. 27, 1942 |
| 2,357,563 | Truxell | Sept. 5, 1944 |
| 2,430,764 | Gabriel | Nov. 11, 1947 |
| 2,449,297 | Hoffer | Sept. 14, 1948 |
| 2,847,938 | Gonder | Aug. 19, 1958 |

FOREIGN PATENTS

| 424,609 | Great Britain | Feb. 25, 1935 |